(12) United States Patent
Torok et al.

(10) Patent No.: US 9,293,138 B2
(45) Date of Patent: Mar. 22, 2016

(54) STORING STATE INFORMATION FROM NETWORK-BASED USER DEVICES

(71) Applicant: Rawles LLC, Wilmington, DE (US)

(72) Inventors: Fred Torok, Seattle, WA (US); Michael Dale Whiteley, Seattle, WA (US); Vikram Kumar Gundeti, Seattle, WA (US); Vikas Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 13/894,256

(22) Filed: May 14, 2013

(65) Prior Publication Data

US 2014/0343946 A1 Nov. 20, 2014

(51) Int. Cl.
G10L 21/00 (2013.01)
G10L 15/00 (2013.01)
G10L 15/30 (2013.01)

(52) U.S. Cl.
CPC ...................................... *G10L 15/30* (2013.01)

(58) Field of Classification Search
None
See application file for complete search history.

(56) References Cited

U.S. PATENT DOCUMENTS

| | | | |
|---|---|---|---|
| 6,206,745 B1* | 3/2001 | Gabai | A63H 3/28 446/175 |
| 6,773,322 B2* | 8/2004 | Gabai | A63H 30/04 446/175 |
| 7,418,392 B1 | 8/2008 | Mozer et al. | |
| 7,715,859 B2* | 5/2010 | O'Shaughnessy | H04L 67/24 455/518 |
| 7,720,683 B1 | 5/2010 | Vermeulen et al. | |
| 7,774,204 B2 | 8/2010 | Mozer et al. | |
| 8,120,459 B2* | 2/2012 | Kwak | G07C 9/00309 340/5.2 |
| 8,195,319 B2* | 6/2012 | Kristjansson et al. | 700/94 |
| 8,428,759 B2* | 4/2013 | Kristjansson et al. | 700/94 |
| 8,484,033 B2* | 7/2013 | Nagashima | 704/270 |
| 8,504,185 B2* | 8/2013 | Kristjansson et al. | 700/94 |
| 9,092,818 B2* | 7/2015 | Argue | G06Q 30/0639 |
| 2012/0110135 A1 | 5/2012 | Sparks | |
| 2012/0223885 A1 | 9/2012 | Perez | |
| 2014/0249817 A1* | 9/2014 | Hart et al. | 704/239 |
| 2014/0365884 A1* | 12/2014 | Kara et al. | 715/704 |

FOREIGN PATENT DOCUMENTS

| | | |
|---|---|---|
| CA | 2676960 | 2/2011 |
| EP | 2375802 | 10/2011 |
| WO | WO2011088053 | 7/2011 |

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

PCT Search Report and Written Opinion mailed Sep. 19, 2014 for PCT Application No. PCT/US14/37206, 7 Pages.

* cited by examiner

*Primary Examiner* — Satwant Singh
(74) *Attorney, Agent, or Firm* — Lee & Hayes, PLLC

(57) ABSTRACT

Network-based services may be provided to a user through the user of a speech-based user device located within a user environment. The speech-based user device may accept speech commands from a user and may also interact with the user by means of generated speech. Operating state of the speech-based user device may be provided to the network-based service and stored by the service. Applications that provide services through the speech-based interface may request and obtain the stored state information.

25 Claims, 5 Drawing Sheets

STORING STATE INFORMATION FROM NETWORK-BASED USER DEVICES

BACKGROUND

Homes and other user premises are increasingly equipped with always-on Internet or "cloud" connectivity. In many cases, even mobile users have constant or nearly constant data connectivity. The common availability of network communications has created a number of new possibilities for services and other functionality, using the variety of connected devices accessible to users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes devices, systems, and services that interact with users to provide network-accessed speech-based services. A speech-based service may be configured to receive speech-related information from network-based user devices in the homes of different users. In addition, the speech-based service may receive state information from the user devices, indicating current states of the user devices. Device state information may relate to the conditions of user interface elements of the user devices such as indicators and physical controls. Device state information may also include internal operating states of the user devices, including the states or progress of activities being performed by the user devices. In some implementations, the state information may comprise the output of various sensors of the user devices, and/or ambient conditions detected based on the output of device sensors.

The speech-based service exposes an API (application programming interface) that may be accessed by various network-based applications to provide services in conjunction with the user devices. The applications may be implemented as part of the speech-based service or by third-party providers. The API allows the applications to receive information from the user devices and to perform operations using the user devices.

The speech-based service implements a device state service, which is configured to receive and store the state information from the user devices. The stored state information is made available through an API to the applications, so that the applications can obtain current device state information without having to directly query the user devices. The state information may be provided to the applications in response to explicit requests, or may be provided in the form of callbacks to applications that have previously requested to receive such callbacks.

Figure 1:
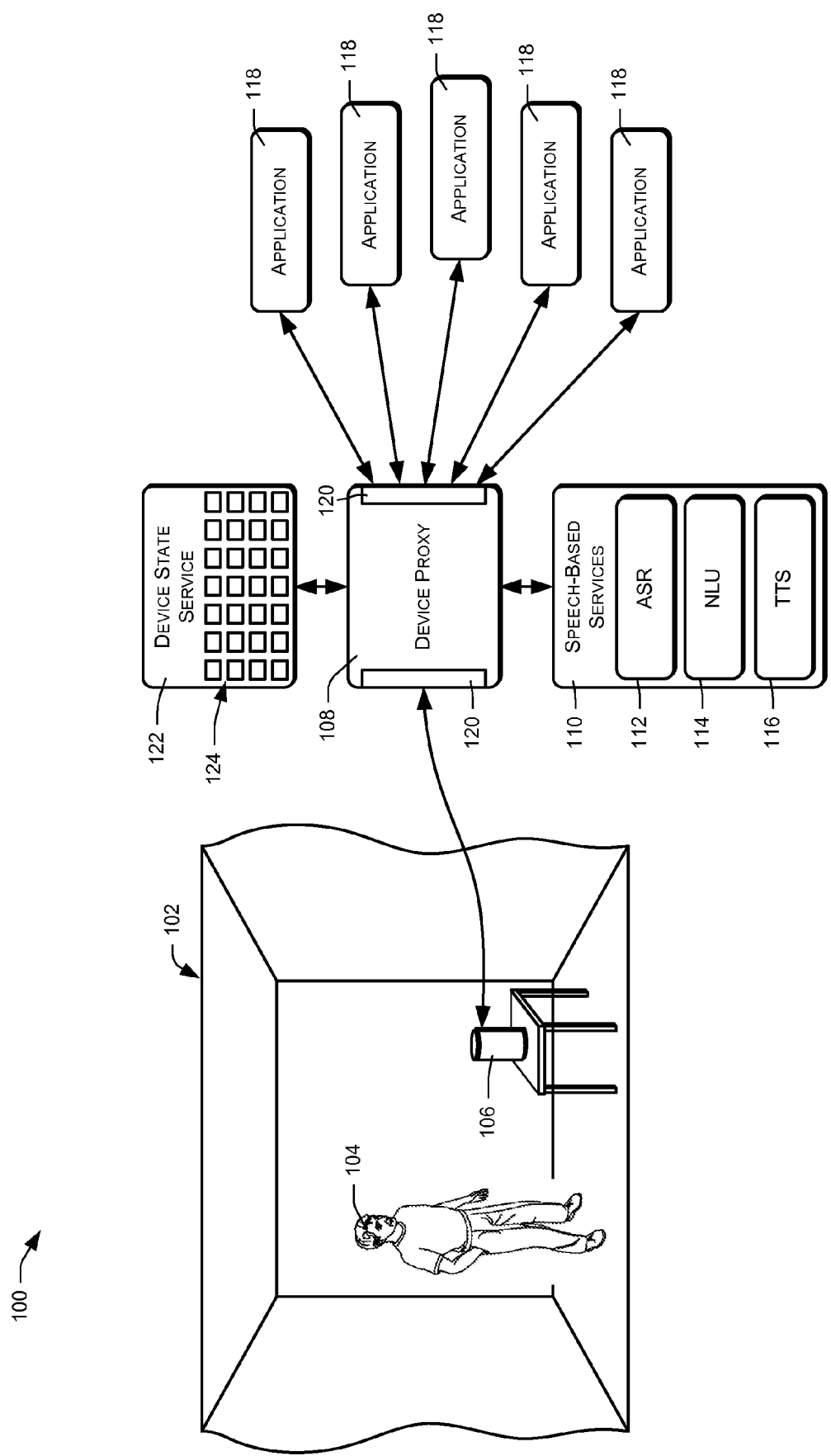
FIG. 1 shows an illustrative environment in which a speech interface platform may be accessed by a user from a home.

FIG. 1 illustrates an environment 100 in which these techniques may be practiced. The environment 100 may comprise a room or other user premises 102. User premises may include houses, offices, automobiles, and other spaces or areas.

Within the user premises 102 is a user 104 and one or more user devices 106. A user device 106 may in some embodiments comprise a network-based or network-accessible device having one or more microphones, a speaker, and a network or other communications interface. In certain embodiments, the user device 106 may also have other elements designed for user interaction, including buttons, knobs, lights, indicators, and various types of sensors, input elements, and output elements.

In an embodiment described herein, the user device 106 receives spoken commands from the user 104 and provides services in response to the commands. Provided services may include performing actions or activities, rendering media, obtaining and/or providing information, providing information via generated or synthesized speech via the user device 106, initiating Internet-based services on behalf of the user 104, and so forth.

In the embodiment shown in FIG. 1, the user device 106 communicates with a network-accessible device proxy 108. The device proxy 108 may be implemented as a network-based or cloud-based service that is located remotely with respect to the user device 106. For example, the device proxy 108 may be implemented by a business organization and/or service provider to support multiple user devices 106 that are located in different user premises, which in turn may be located in widely varying geographic locations. Communications between the user device 106 and the device proxy 108 may be implemented through various types of data communications networks, including local-area networks, wide-area networks, and/or the public Internet. Cellular and/or other wireless data communications technologies may also be used to communicate with the device proxy 108. The user premises 102 may include local network support equipment to facilitate communications with the device proxy 108, such as wireless access points, network routers, communication hubs, etc.

The device proxy 108 may interact with a variety of services and/or applications in support of multiple user devices 106. As an example, such services may include speech-based services 110. The speech-based services 110 may be configured to receive real-time audio or speech information from the user device 106 in order to detect user utterances, to determine user intent based on the utterances, and to perform actions or provide services in fulfillment of the user intent. For example, the user may speak predefined commands (e.g., "Awake"; "Sleep"), or may use a more casual conversation style when interacting with the user device 106 (e.g., "I'd like to go to a movie. Please tell me what's playing at the local cinema."). User commands may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth.

In one implementation, the speech-based services 110 receive speech-related information and other information from the user device 106. The speech-related information may include audio signals, audio streams, text streams recognized from user speech, user commands or notifications derived from recognized speech.

Speech-related information may be provided to the speech-based services 110 in many different forms. In some implementations, the speech-related information may comprise a continuous audio signal or stream from the user device 106. Alternatively, the speech-related information may comprise audio clips or segments, provided to the speech-based services 110 in response to detected audio activity within the user premises 102.

Audio from the user premises 102 may in some cases be processed by the user device 106 before being provided to the speech-based services 110. For example, captured audio may be compressed, filtered, or otherwise optimized by the user device 106. In some cases, the user device 106 may perform initial speech recognition, and the speech-related information may comprise text that has been recognized from the user speech.

The speech-based services 110 process the received speech-related information to determine various data about user activities, status, environmental conditions, commands, etc. This data is then used to perform services for or on behalf of the user 104. In some implementations, the speech-based services 110 may interact with the user 104 by generating or specifying speech that is in turn rendered by the user device 106.

In certain embodiments, the speech-based services may include components or functionality for recognizing speech, understanding user intent, and generating speech. For example, the speech-based services 110 may include an automatic speech recognition (ASR) component 112, a natural language understanding (NLU) component 114, and a text-to-speech (TTS) component 116.

The device proxy 108 may be configured to support a plurality of network-based applications 118. The applications 118 interact with the user devices 106 through the device proxy 108 to provide functionality in conjunction with the user device 106, based at least in part on information obtained or derived from the user device 106. The provided functionality may be in support of or in addition to the functionality provided by the speech-based services 110.

More specifically, the device proxy 108 may be configured to communicate with the user device 106 in order to receive various types of information from the user device 106 as well as to provide instructions, commands, and content to the user device 106. The applications 118 communicate through the device proxy 108 in order to receive information from designated user devices 106 and to provide instructions, information, and content to the user devices 106. In some cases, the device proxy 108 may use a first set of data formats and/or protocols to communicate with the user device 106, allowing transfer of relatively low-level or detailed data. The device proxy 108 may use a second set of data formats and/or protocols to communicate with the applications 118, allowing information to be transferred at a relatively higher level of abstraction or using different types of communications protocols.

In addition to acting as a speech interface, the user device 106 may provide various other types of capabilities and functionality for the benefit of the user 104. For example, the user device 106 may act as a media device, for playing music, video, or other content within the user premises 102. In some cases, the user device 106 may be configured to receive and present media or other data from third-party services such as music services, video services, data services, social media services, email services, and other information sources or providers.

The user device 106 may also have various types of environmental sensors, such as proximity sensors, audio sensors, cameras, and so forth. Using such sensors, the user device 106 may be capable of detecting environmental and user-related information, such as the presence or position of a user in a room, physical characteristics of the room or objects within the room, the identity of a user who is speaking, etc.

The applications 118 may in some cases be implemented as web-based or network-based applications or services. For example, a particular application 118 may be implemented as a server or service by the provider of the device proxy 108 or by a third-party provider, and may communicate with the device proxy 108 through a network such as the Internet. In other cases, an application 118 may reside or be installed on a physical device associated with the user 104, such as a computer or mobile device of the user 104, and may communicate with the device proxy 108 through the Internet or other wide-area network.

The device proxy 108 may be configured to interact with the user device 106 and/or the applications 118 according to a web services model and the functionality of the device proxy 108 may be implemented as one or more web services. Generally, a web service may comprise any type of computing service that is made available to a requesting client via a request interface that includes one or more Internet-based application layer data transport protocols, such as a version of the Hypertext Transport Protocol (HTTP) or another suitable protocol.

The device proxy 108 may expose one or more network-accessible APIs or application interfaces 120. The APIs 120 may be implemented as a web services endpoints, having Uniform Resource Locators (URLs), e.g., http://storageservice.domain.com. The APIs 120 may also be implemented or exposed by the speech-based services 110 and the device state service 122.

Web services may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments the resulting document may be encapsulated within another protocol, such as a version of the Simple Object Access Protocol (SOAP), for example, in order to facilitate processing of the web services request by the endpoint.

Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

The applications 118 may be designed and provided by various venders and/or providers to work in conjunction with the user device 106 and/or to provide services using the user device 106, by way of the APIs 120 and associated services. As an example, an application 118 may comprise a controller application that is designed to act as a remote control for the user device 106. Such a controller application may execute on a mobile device of the user 104, or may be accessible through a web interface using an Internet browser. The controller application may display and allow the user to change various settings of the user device 106. For example, the controller application may display the current audio volume setting of the user device 106, and may allow the user to change the volume by interacting with the controller application. The controller application may also allow the user to provide configuration and setup information for the user device 106.

Various other types of applications 118 may be provided for use in conjunction with user devices, providing functionality ranging from email to games. The applications 118 may base their services in part on speech-related information that is provided by the user device 106 and the speech-based services 110, including recognized text of speech, user intents derived from recognized speech, and commands that have been interpreted from user speech. In addition, the applications 118 may provide speech that is to be rendered on the user device 106, and may provide other instructions and commands to the user device 106 via the device proxy 108 and the APIs 120.

A device state service 122 may be provided for use in conjunction with the device proxy 108 to provide information to the applications 118 regarding the operating state of the user devices 106. The device state service 122 communicates with individual user devices 106 to receive state information indicating state values corresponding to various operational characteristics of the user devices 106.

State information may include the status of mechanical or physical user interface elements of the user device 106, such as buttons, indicators, knobs, displays, etc. State information may also include the status of logical functions of a user device 106, such as information about media that is currently being played, speech that is being rendered, audio volume settings, and so forth. Similarly, state information may include the status or progress of activities being performed by the user device 106, and may include status maintained or generated by software or applications running on the user device 106. State information may further include information regarding or derived from device sensors, as well as the operational status of communications elements such as Bluetooth™ interfaces, network interfaces, etc.

The device state service 122 maintains state information 124 that is received from and corresponds to multiple user devices 106. The state information 124 may be maintained and cached by the device state service 122, and may be stored and made available even when the user device 106 has been disconnected from communications and is temporarily not communicating with the device proxy 108. When the user device 106 reconnects to the device proxy 108, any potentially outdated state information 124 may be refreshed by means of a comprehensive state update message from the user device 106.

In some implementations, the state information 124 for a particular user device 106 may be organized or partitioned into different categories, corresponding to different functionalities or applications of the user device 106.

The applications 118 may request state information corresponding to the user device 106 by way of the APIs 120. In some cases, the applications 118 may register to receive callbacks via the APIs 120, where the callbacks notify the applications of device state changes. In other cases, the applications 118 may receive state information in response to explicit requests.

Having state information available in this manner enables the applications 118 to obtain the state information 124 without having to directly query the user devices 106, and to obtain state information even when user devices 106 are unavailable for communications.

Although the APIs 120 are shown in FIG. 1 as being associated with the device proxy 108, the APIs may be implemented on other components or functional elements, including the speech-based services 110, the device state service 122, and other components. The user device 106 and the applications 118 may be configured in some situations to communicate directly with such components rather than communicating solely through the device proxy 108. Furthermore, it should be understood that the various functionality described herein may be allocated across different logical elements in ways other than shown in FIG. 1.

Figure 2:
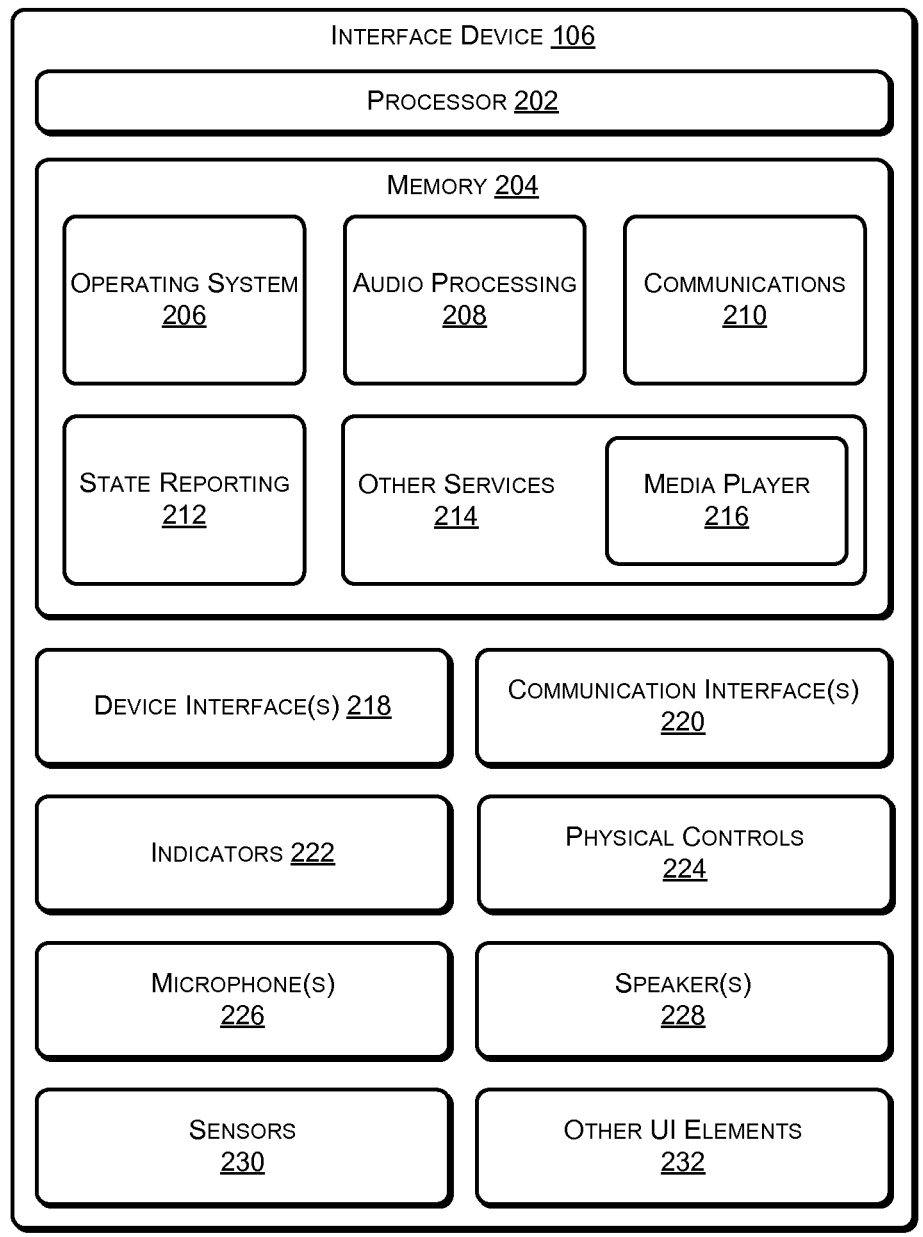
FIG. 2 is a block diagram showing selected functional components of a speech-based user device such as shown in the environment of FIG. 1.

FIG. 2 shows an example configuration of an user device 106. In the example of FIG. 2, the user device 106 may include operational logic, which in many cases may comprise a processor 202 and memory 204. The memory 204 may contain applications and programs in the form of instructions that are executed by the processor 202 to perform acts or actions that implement desired functionality of the user device 106.

FIG. 2 shows several examples of applications and/or programs that may be provided by the user device 106 and stored by the memory 204 to implement basic functionality of the user device 106, although many other applications and types of functionality may be provided in various embodiments.

The user device 106 may have an operating system 206 that is configured to manage hardware and services within and coupled to the user device 106. In addition, the user device 106 may include an audio processing module 208 that receives audio from the user premises 102 and that processes the received audio to perform actions and provide services in response to user speech. In some cases, the audio processing module 208 may perform speech recognition and natural language understanding with respect to received audio. In other cases, the audio processing module may convey received audio to the device proxy 108, which may use the speech-based services 110 to perform speech processing, such as speech recognition and natural language understanding. The audio processing module 208 may perform various types of audio processing, including filtering, compressing, and so forth, and may utilize digital signal processors or other methods of signal processing.

The audio processing module 208 may also be responsible for producing or generating speech. For example, the user device 106 may receive text from the device proxy 108, and may convert the text to speech. Alternatively, the user device 106 may receive an audio signal that is processed by the audio processing module 208 for rendering by the user device 106.

The user device 106 may have a communications component 210 that is configured to establish a communications channel with the device proxy 108. Various types of communication protocols may be supported by the communications component 210. In some cases, the communications component 210 may be configured to establish a secured and/or encrypted communications channel with the device proxy 108 through the APIs 120, using one of various types of network communications technologies.

The user device 106 may also have a state reporting module 212 that is configured to report operating state information of the user device 106 to the device state service 122 of the device proxy 108. The state reporting module 212 may be configured to report changes in the operational state of the user device 106 in real time, as state changes occur. The state reporting module 212 may also be configured to provide comprehensive reports to the device state service 122 in some situations, in which all elements of current device state are enumerated. For example, a comprehensive state report may be generated and provided upon initialization of the user device 106 or upon connection to the device proxy 108. In some implementations, the user device 106 may proactively provide state information to the device state service 122. In other implementations, the device state service 122 may poll or query the user device 106 to obtain current state information.

Generally, the state information provided to the device state service 122 may include any parameters that indicate any operational aspect of the user device 106. Examples of device state information include:

states of visual indicators of the user devices;
states of physical controls of the user devices;
status of activities, services, or functions performed or being performed by the user devices, such as media playback, scheduled actions, speech generation, settings, configuration, and/or diagnostic information;
status of applications or software running on the user devices; output of device sensors;
conditions deduced, inferred, or produced from various device controls and sensors; and
environmental information detected by the user devices based on information from device sensors.

In addition to the software functionality described above, the user device 106 may implement various types of other applications, functions, and/or services 214. For example, the other services 214 may include an audio function or application, referred to as a media player 216 in FIG. 2, for playing songs or other types of audio in response to user instructions or under the direction of the speech-based services 110 or the applications 118. The media player 216 may receive audio from the device proxy 108, from one or more of the applications 118, or from third-party services such as music services, podcast services, and so forth. For example, the device proxy 108 and/or one of the applications 118 may instruct the user device 106 to obtain and play a particular song from a third-party service. Upon receiving this instruction, the media player 216 of the user device 106 may contact the third-party service, initiate streaming or downloading of the song, and may then play the song without further instructions or information from the device proxy 108 or the application 118 that instructed the user device 106 to play the song. Similarly, a playlist may be provided to the media player 216 for playback by the media player 216 of the user device 106.

The user device 106 may also include various types of hardware-based components or functionality, including device interfaces 218 and communications interfaces 220. The device interfaces 218 may provide connections to auxiliary devices such as Bluetooth™ devices, remote presentation devices, remote sensors, etc. The communication interfaces 220 may include network interfaces and other types of interfaces that allow the user device 106 to connect to and communicate with the device proxy 108.

The user device 106 may have various types of indicators 222, such as lights that are used to communicate operating information to the user 104. The indicators 222 may include LEDs (light-emitting diodes), flat-panel display elements, text displays, etc.

The user device 106 may also have various types of physical controls 224, which may include buttons, knobs, sliders, touch sensors, etc. The physical controls 224 may be used for basic functionality such as enabling/disabling the user device 106, setting the audio output volume of the user device 106, and so forth.

The user device 106 may include a microphone unit 226 that includes one or more microphones to receive audio input, such as user voice input. The microphone unit 226 may comprise a directional microphone array in some implementations, so that sounds from different directions may be selectively received and/or enhanced. The user device 106 may also include a speaker 228 for output of audio.

In addition to the physical controls 224 and the microphone unit 226, the user device 106 may have various other types of sensors 230, which may include still and video cameras, depth sensors, 3D (three-dimensional) camera, infrared sensors, proximity sensors, sensors for measuring levels of ambient sound and light, and so forth. The user device 106 may also have analytic capabilities that utilize information from the sensors 230 to determine characteristics of the user premises 102 and environmental conditions within the user premises 102. For example, the user device 106 may be capable of analyzing optical information to determine 3D characteristics of a room, including the presence and/or identity of people or objects within the room. As another example, the user device 106 may be capable of detecting and evaluating audio characteristics of a room in order to optimize audio playback.

The user device 106 may also have other user interface (UI) elements 232 for interacting with the user 104. The other UI elements may include display panels, projectors, touch panels, keyboards, etc.

In operation, upon initialization or upon connection to the device proxy 108, the user device 106 may send a report to the device state service 122 that enumerates a complete or comprehensive set of state parameters. Subsequently, the user device 106 may send update reports to the device state service 122, indicating state parameters that have changed since the last update and the values of any changed parameters.

The state parameters may include values or output states of the indicators 222, positions or input states of the physical controls 224, information regarding connection states of the device interfaces 218 and communication interfaces 220, operational states of software-implemented functionality or services 214, information obtained, derived, or deduced from the sensors 228, and the states or conditions of other UI elements 232.

The device state service 122 stores the state information received from the user device 106 in association with a device identifier (ID) of the user device 106, for use by the applications 118 and by the speech-based services 110. A device ID may be any information used to directly or indirectly identify a device or a user of the device. For example, a device ID may include a hardware identifier of the device, a network identifier of the device (e.g., an IP address), a user name, or a location.

The applications 118 may query the device proxy 108 for device state information regarding the user device 106, which may be identified by its device ID. In response, the device proxy 108 obtains the most recently stored state information for the user device 106 from the device state service 122, as previously reported from the user device 106. The applications 118 may respond to the state information as appropriate, depending on the designed functionality of each of the applications 118. This allows the applications 118 to have quick access to state information, without the need to wait for communications with the user device 106.

The state information provided by the user device 106 and stored by the device state service 122 may vary depending on the characteristics and functional capabilities of the user device 106. In addition to the types of state information already described, certain types of user devices may be capable of reporting more complex state information regarding both the user device 106, the environment within which the user device 106 is located, and the situation of the user device 106 relative to the environment. Environmental state information may include the results of various types of room analyses, such as the shape of a room and the locations and/or identifications of objects and people within the room. In certain implementations, environmental state information may include an acoustic model of a room or other environment, indicating reflective audio surfaces. Such an acoustic model or similar type of state information may be used by the applications 118 and/or the speech-based services 110 to optimize audio playback within the room.

In certain situations, the user device 106 may comprise a mobile device such as a smartphone, tablet computer, glasses, watch, etc. Mobile devices may have sensors such as compasses, accelerometers, gyroscopes, global positioning receivers, and so forth, as well as having capabilities of determining various environmental information based on applications and access to network-based information resources. In these situations, environmental state information may include position or global coordinates of the user device, orientation of the device, speed at which the device is moving, ambient light levels, temperature, humidity, etc. Such environmental state information may be reported as described above, and cached by the state service 122 for use by the applications 118.

Applications or software running on the user device 106 may also have or produce state information. In the case of a mobile user device, for example, a navigation application may maintain state information indicating the destination of a user, the estimated arrival time of the user, the location of the user, and so forth. Similarly, a music playback application may have state information regarding the name of a song that is currently playing, the duration of the song, the remaining time of the song, whether playback has been paused or stopped by the user, etc.

Further specific examples of user device state include:
  connection status and/or proximity of local auxiliary devices such as wireless headphones, Bluetooth™ devices, displays, audio sources, etc.;
  status of connections to the device proxy;
  direction from which the user device is receiving audio;
  settings, configuration, and diagnostic information regarding the user device;
  scheduled actions to be performed by the user devices, such as reminders, notifications, and alarms;
  text or other identification of speech and/or audible prompts being played by the user device.

Figure 3:
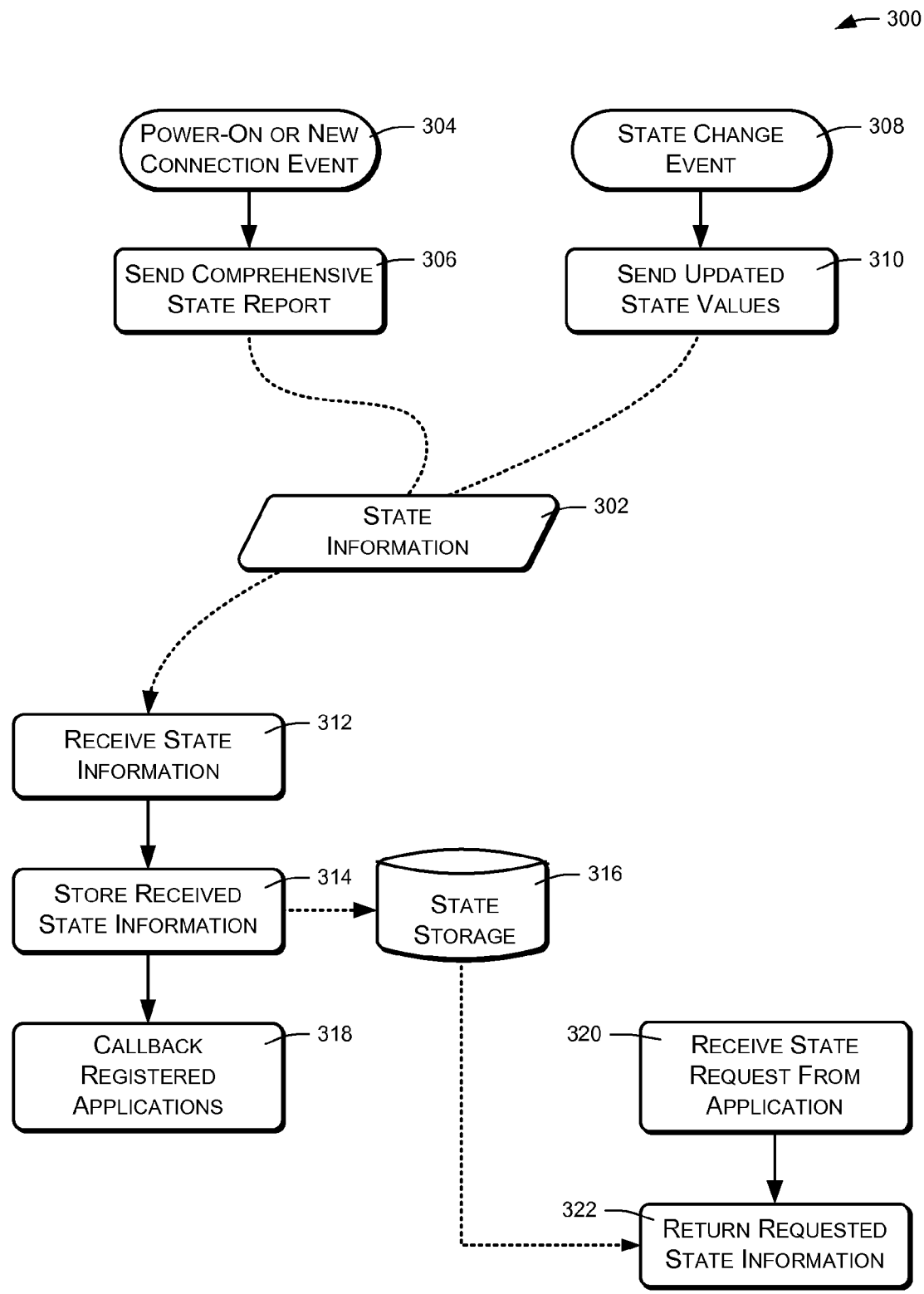
FIG. 3 is a flow diagram illustrating an example process for storing state information from network-based user devices and providing the stored state information to network-based applications.

FIG. 3 shows an example process 300, illustrating interactions between the user device 106, the device proxy 108, and the applications 118. Although the process 300 is described with reference to the environment of FIG. 1, the process may also be used in other environments.

Generally, the user device 106 is configured to provide state information 302 to the device proxy 108 upon initialization, upon establishing or reestablishing communications with the device proxy 108, and upon detecting changes in operating state. The state information 302 indicates one or more state parameters names and their most recent values.

Communications between the user device and the device proxy 108 may be performed using a persistent communications channel that is set up and maintained in accordance with techniques described in a U.S. patent application entitled "Load-Balanced, Persistent Connection Techniques," filed Apr. 8, 2013, having Ser. No. 13/858,753, which is incorporated by reference herein.

An event 304 may represent initialization of the user device 106 and/or establishment of a data communications channel with the device proxy 108. In response to the event 304, the user device 106 may perform an action 306 of sending the state information 302 to the device proxy 108. In this case, the state information 302 may comprise a comprehensive listing of state parameters and their values.

A state change event 308 may represent a change in one or more states or state parameters of the user device 106. In response to the state change event 308 the user device 106 may perform an action 310 of sending the state information 302 to the device proxy 108 of state service 122. In this case, the state information 302 may comprise a limited listing of state parameters, including only those parameters whose values have changed.

The device proxy 108 or state service 122 receives the state information 302 at an action 312. An action 314, performed by the state service 122, comprises caching the state information 302 in state storage 316.

In some situations, certain applications 118 may have previously registered to receive callbacks from the device proxy 108 or state service 122 regarding specified state changes or certain types or categories of state changes that occur in identified user devices. In these situations, an action 318 may also comprise calling or providing callbacks to the registered applications, indicating state changes in individual user devices. Callbacks may be performed in response to any state changes, or in response to specific types of state changes specified by registering applications.

In other situations, the device proxy 108 may provide state information in to applications 118 in response to explicit requests from the applications 118. In these situations, an action 320 may comprise receiving a request from an application for state information regarding a particular identified user device 106. The request may identify the user device 106 and may indicate one or more state parameters that are requested.

In response to the receiving the request, an action 322 may comprise returning the requested state information to the requesting application 118. The returned state information may be obtained from the state storage 316, rather than directly querying the user device 106 from which the state information originated.

Figure 4:
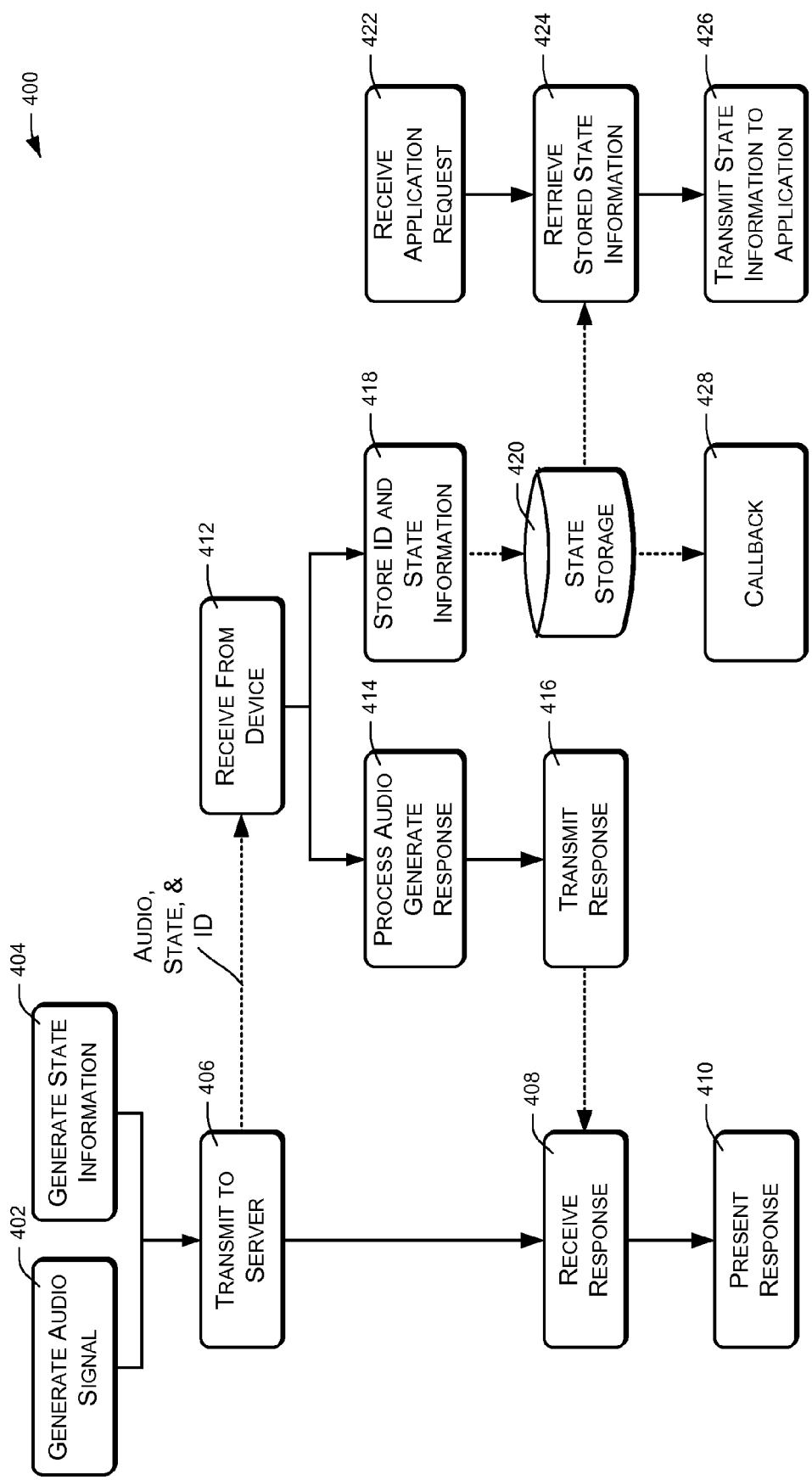
FIG. 4 is a flow diagram illustrating the method of FIG. 3 in the context of speech-based services.

FIG. 4 illustrates additional details regarding interactions between the user device 106, the device proxy 108, and the applications 118. In particular, FIG. 4 illustrates a method 400 for storing and providing state information in conjunction with speech-related services that may be provided in the environment illustrated by FIG. 1. The actions along the left side of FIG. 4 are performed by the user device 106, while remaining actions shown in FIG. 4 are performed by server devices or components such as the device proxy 108, speech-based services 110, and/or device state service 122.

An action 402 comprises generating an audio signal from an utterance received from the user 104. An action 404 comprises generating state information in response to a change of state on the user device 106.

An action 406 comprises transmitting the audio signal and the state information to one or more servers or server computers. In addition, the action 406 may comprise transmitting an identifier of the user device 106 to the one or more server computers. The audio signal and the state information may be transmitted at different times and may not be related to one another. For example, the audio signal may relate to a user request to play a particular song, and this request may be transmitted to the one or more server computers. Later, the device many commence playing the song, and in response, the device may transmit the state change corresponding to the playing of the song.

An action 408 comprises receiving a response from the one or more server devices. The response may specify speech or music to be rendered by the user device 106 or other information. An action 410 comprises presenting the response to the user 104, such as by rendering speech specified by the response.

An action 412, performed by the one or more server computers or devices, comprises receiving the audio signal, the state information, and the device identifier from the user device. As noted above, the audio signal and state information may be received at different times. An action 414 comprises processing the received audio signal, such as by performing speech processing on the received audio signal, to generate a response. An action 416 comprises transmitting the response to the user device 106.

An action 418 comprises storing or caching the received state information in association with the received identifier of the user device in a state storage 420.

An action 422 comprises receiving a request from an application for state information. The request may indicate the identifier of a particular user device for which the state information is requested.

An action 424 comprises obtaining or retrieving the requested state information from the state storage 420. An action 426 comprises transmitting the state information to the requesting application.

As an alternative mechanism for providing state information to applications, an application may register to receive callback or other notifications upon changes in the state information of a particular user device. In this situation, an action 428 may comprise performing a callback or other notification to the registered application, indicating any changed state information.

In some situations, the device identifier may be transmitted by the user device 106 in an initial communication, in conjunction with setting up a communications channel. The communications channel may subsequently be associated with the device identifier, so that subsequent communications over the communications channel do not need to explicitly include the device identifier. In other situations, the device identifier may be included in every communication between the user device and the server device.

Figure 5:
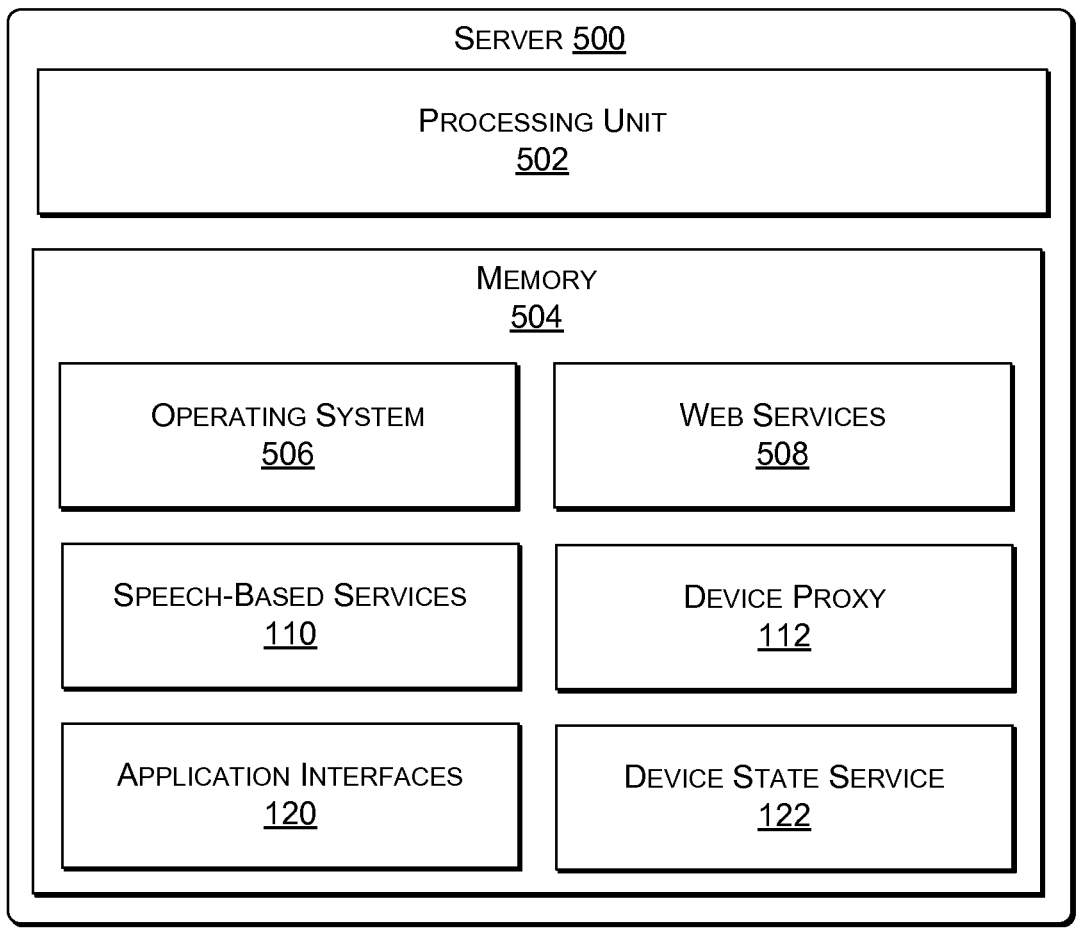
FIG. 5 is a block diagram illustrating components of a server device that may be used in part to implement the device support service described herein.

FIG. 5 illustrates relevant components of a server 500 that may be used to implement the functionality of the device proxy 108, the speech-based services 110, the device state service 122, and/or other components that may be used to provide services as described herein. Generally, functional elements may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 500 may comprise a processing unit 502 composed of one or more processors and associated memory 504. Depending on the configuration of the server 500, the memory 504 may be a type of computer storage media and may include volatile and nonvolatile memory. Thus, the memory 504 may include, but is not limited to, RAM, ROM, EEPROM, flash memory, or other memory technology.

The memory 504 may be used to store any number of functional components that are executable by the processing unit 502. In many embodiments, these functional components comprise instructions or programs that are executable by the processing unit 502, and that when executed implement operational logic for performing the actions described above.

Functional components stored in the memory 504 may include an operating system 506 and a web service component 508 that interacts with remote devices such as computers, media consumption devices, and so forth. The memory 504 may also have instructions implementing the speech-based services 110, the device proxy 108, the APIs 120, and the device state service 122. In some cases, one or more of the applications 118 may also be implemented as functional components stored in the memory 504.

The server 500 may of course include many other logical, programmatic, and physical components that are not shown in FIG. 5.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
  a user device configured to:
    generate an audio signal from an utterance received from a user;
    generate state information in response to a change of state on the user device, the state information indicating a device state of one or more user devices;
    transmit the audio signal, the state information, and an identifier of the user device to one or more server computers;
    receive a response from the one or more server computers; and
    present the response to the user;
  the one or more server computers configured to:
    receive the audio signal from the user device;
    generate the response by performing speech processing on the audio signal;
    transmit the response to the user device;
    receive the state information and the identifier of the user device from the user device;
    store the state information in association with the identifier of the user device;
    receive a request from an application for the state information; and
    transmit the state information to the application.

2. The system of claim 1, wherein the user device is further configured to transmit the state information in response to the change of state on the user device.

3. The system of claim 1, wherein the user device is further configured to transmit the state information upon initialization of the user device.

4. The system of claim 1, wherein the state information includes one or more of the following:
state of a visual indicator of the user device; or
state of a physical control of the user device.

5. The system of claim 1, wherein the state information indicates state of one or more of the following:
media playback;
scheduled actions;
speech generation;
settings;
configuration;
diagnostics; or
an application running on the user device.

6. The system of claim 1, wherein the audio signal, the state information, and the identifier of the user device are transmitted in a single transmission.

7. One or more non-transitory computer-readable media storing computer-executable instructions that, when executed by one or more processors, cause the one or more processors to perform acts comprising:
receiving information at a server device from a user device that is located remotely from the server device, the received information including state information indicating a plurality of device states of the user device;
storing the state information of the user device in association with an identifier of the user device; and
providing at least a portion of the state information of the user device to an application.

8. The one or more non-transitory computer-readable media of claim 7, wherein the received information includes the identifier of the user device.

9. The one or more non-transitory computer-readable media of claim 7, the acts further comprising receiving the identifier of the user device in conjunction with establishing communications with the user device.

10. The one or more non-transitory computer-readable media of claim 7, wherein the application provides services for the user in conjunction with the user device.

11. The one or more non-transitory computer-readable media of claim 7, wherein providing the state information of the user device to an application comprises providing the state information to the application in response to a request from the application.

12. The one or more non-transitory computer-readable media of claim 7, wherein providing the state information of the user device to an application comprises processing a callback request in response to receiving the information.

13. The one or more non-transitory computer-readable media of claim 7, the acts further comprising providing the state information to the application in response to a change in the state information.

14. The one or more non-transitory computer-readable media of claim 7, the acts further comprising:
receiving an audio signal from the user device;
generating a response by performing speech processing on the audio signal; and
transmitting the response to the user device.

15. The one or more non-transitory computer-readable media of claim 7, wherein the state information includes one or more of the following:
state of a visual indicator of the user device; or
state of a physical control of the user device.

16. The one or more non-transitory computer-readable media of claim 7, wherein the state information indicates state of one or more of the following:
media playback;
scheduled actions;
speech generation;
settings;
configuration; or
diagnostics.

17. The one or more non-transitory computer-readable media of claim 7, wherein the state information includes environmental information collected from one or more sensors of the user device.

18. A method comprising:
receiving information at a server device from a user device that is located remotely from the server device, the received information including state information indicating a plurality of device states of the user device;
storing the state information of the user device in association with an identifier of the user device; and
providing at least a portion of the state information of the user device to an application.

19. The method of claim 18, further comprising
receiving an audio signal from the user device;
generating a response by performing speech processing on the audio signal; and
transmitting the response to the user device.

20. The method of claim 18, further comprising providing the state information to the application in response to a request from the application.

21. The method of claim 18, further comprising providing the state information to the applications in response to a change in the state information.

22. The method of claim 18, wherein the application provides services for the user in conjunction with the user device.

23. The method of claim 18, wherein providing the state information of the user device to an application comprises processing a callback request in response to receiving the information.

24. The method of claim 18, wherein the state information includes one or more of the following:
connection state of the user device;
direction from which the user device is receiving audio;
settings, configuration, or diagnostic information regarding the user device; or
scheduled actions to be performed by the user device.

25. The method of claim 18, wherein the state information includes environmental information based at least in part on optical imaging sensors of the user device.

* * * * *